United States Patent [19]

Nakamura et al.

[11] Patent Number: 4,893,193

[45] Date of Patent: Jan. 9, 1990

[54] DISC RECORDING MEDIUM AND APPARATUS FOR PLAYBACK THEREOF

[75] Inventors: Shoichi Nakamura; Tadao Suzuki, both of Tokyo, Japan

[73] Assignee: Sony Corporation, Tokyo, Japan

[21] Appl. No.: 266,207

[22] Filed: Oct. 27, 1988

Related U.S. Application Data

[63] Continuation of Ser. No. 163,132, Feb. 24, 1988, abandoned, which is a continuation of Ser. No. 763,132, Jul. 30, 1985, abandoned.

[30] Foreign Application Priority Data

Nov. 30, 1983 [JP] Japan .................. 58-226598

[51] Int. Cl.[4] ................ H04N 5/92; G11B 20/12; G11B 27/10
[52] U.S. Cl. .................... 358/341; 358/342; 369/32; 369/49
[58] Field of Search ............... 358/341, 342, 343; 360/19.1, 33.1, 32, 48; 369/32, 48, 49, 50, 59

[56] References Cited

U.S. PATENT DOCUMENTS

| | | | |
|---|---|---|---|
| 4,065,795 | 12/1977 | Shutterly ................. | 368/19.1 |
| 4,142,209 | 2/1979 | Hedlund et al. .......... | 358/342 |
| 4,229,808 | 10/1980 | Hui ......................... | 360/48 |
| 4,433,347 | 2/1984 | Sugiyama et al. ........ | 358/342 |
| 4,446,488 | 5/1984 | Suzuki ..................... | 358/342 |
| 4,476,499 | 10/1984 | Kanamaru et al. ....... | 358/342 |
| 4,495,533 | 1/1985 | Chambers ................ | 360/33 |
| 4,496,997 | 1/1985 | Ohtsuki ................... | 360/32 |
| 4,587,643 | 5/1986 | Monen et al. ............ | 369/32 |

FOREIGN PATENT DOCUMENTS 084777 8/1983 European Pat. Off. .
137855 4/1985 European Pat. Off. .
60-119671 6/1985 Japan .

Primary Examiner—Donald McElheny, Jr.
Attorney, Agent, or Firm—Hill, Van Santen, Steadman & Simpson

[57] ABSTRACT

Disk-shaped recording medium on which are recorded a first data signal, such as digital audio data, a second data signal in the direction of reproduction and of the disk, such as digital video data and computer program data, and identification data recorded in the read-in track for representing the fact that the second data signal has been recorded. It is possible for this recording medium to be reproduced by a reproducing apparatus which is exclusively used for a conventional disk-shaped recording medium on which the first data signal alone has been recorded. Also disclosed is an apparatus for reproducing the above-described disk-shaped recording medium. The apparatus includes: a circuit for processing the reproduction of the first data signal: a circuit for processing the reproduction of the second data signal: and a control circuit which is supplied with reproduction control data for discriminating between a conventional disk-shaped recording medium on which the first data signal alone has been recorded and a disk-shaped recording medium on which both the first and second data signals have been recorded. By the output of the control circuit, the control of the reproducing operation of a pickup is changed over, and the circuits for processing the reproduction of the first and second data signals are also changed over from one to the other.

12 Claims, 6 Drawing Sheets

Fig. 3A

| | 1 2 3 4 | 5 6 7 8 | 9 10 11 12 13 14 15 16 |
|---|---|---|---|
| 1 | CONTROL | ADDRESS | TRACK NUMBER TNR(OO) |
| 17 | POINTER | | MIN. |
| 33 | SEC. | | FRAME |
| 49 | 0 0 0 0 0 0 0 0 | | P MIN. |
| 65 | P SEC. | | P FRAME |
| 81 | C R C | CODE | |

Fig. 3B

| | 1 2 3 4 | 5 6 7 8 | 9 10 11 12 13 14 15 16 |
|---|---|---|---|
| 1 | CONTROL | ADDRESS | TRACK NUMBER TNR |
| 17 | X | | MIN. |
| 33 | SEC. | | FRAME |
| 49 | 0 0 0 0 0 0 0 0 | | A MIN. |
| 65 | A SEC. | | A FRAME |
| 81 | C R C | CODE | |

Fig. 3C

| BIT | 1 | 2 | 3 | 4 |
|---|---|---|---|---|
| | 0 | 0 | X | 0 |
| | 0 | 0 | X | 1 |
| | 1 | 0 | X | X |
| | 0 | 1 | X | 0 |
| | 0 | 1 | X | 1 |
| | X | X | 0 | X |
| | X | X | 1 | X |

DISC RECORDING MEDIUM AND APPARATUS FOR PLAYBACK THEREOF

This is a continuation of application Ser. No. 163,132, filed 2/24/88, abandoned which is a continuation of application Ser. No. 763,132, filed July 30, 1985, now abandoned.

TECHNICAL FIELD

This invention relates to a disc recording medium and an apparatus for playback thereof.

BACKGROUND ART

The system employing an optically encoded digital audio disc (referred to hereafter as a compact disc) system, which is applied with an error correcting code of high correctability, can reproduce high-quality stereo music. If character data, still picture data and video game program data are recoded together with the stereo music data on the same compact disc in the same signal format employing the same error correcting code, it becomes possible to reproduce still pictures such as paintings corresponding to the reproduced music or to display the composer's name and the title of the music piece while the user enjoys the to reproduced stereo music, and also possible to reproduce suitable music for running video programs so as to expand the field of application of the present compact disc system. One prior-art compact disc has a data storage capacity of about 500 M bytes and thus can afford storage for both stereo musical data and digital data.

However, since many titles of present compact discs, on which only stereo musical data is recorded, have been already sold, it is preferable to ensure that any disc storing both digital stereo musical and other digital data as above-mentioned can be reproduced without any trouble with respect to the stereo musical data by prior art disc playback systems employed to playback prior art compact discs.

On the other hand, it is desirable to introduce a newly designed disc playback system which is able to playback both of the prior art compact discs and the discs storing two kinds of data as described above, or further able to reproduce discs storing only the other digital data. As regards the discs on which stereo music of same program is recorded, manufacturing the above kind of discs allows not only persons who own the conventional disc playback systems to enjoy high-quality stereo music as before, but also persons who will own new type disc playback systems which have display devices to enjoy both reproduction of stereo music and reproduction of still pictures.

Since the conventional disc playback system, however, aims at reproducing stereo music, when a disc storing digital data such as still picture data played by use of such systems, other than musical data is high level noises are generated so as to cause damage a loudspeaker and so on. Accordingly, the desired disc must prohibit prior art disc playback systems from audibly reproducing digital data other than stereo music. One method is to store the digital data in a pause section between one musical data and another musical data. However, this pause section is not necessarily mute but is sometimes treated as a fade-in and fade-out. Since prior art disc playback systems cannot hold the pause section mute, the pause section cannot store digital data.

DISCLOSURE OF THE INVENTION

Accordingly, an object of the invention is to provide a disc recording medium which stores first digital data such as stereo musical data and second digital data such as still pictures data and which can be used with prior art disc playback systems which can playback only the first digital data without trouble.

Another object of the invention is to provide a disc recording medium which can minimize the waiting time till the start of reproducing of the first digital data.

Still another object of the invention is to provide an apparatus for playback of a disc which can use both prior art digital discs storing, for example, only stereo musical data, and discs storing two kinds of data, for example, stereo musical data and still picture data, and in particular an apparatus for playback of a disc which can prevent noise when the apparatus reproduces digital data other than audio data.

In order to achieve the above objects, in this invention, a disc recording medium stores first digital data and second digital data after the end of the first digital data, and comprises a lead-in track including recognition data indicating whether the disc stores the second digital data.

Furthermore in this invention, an apparatus for playback of a disc is capable of playing a first disc storing first digital data and a second disc storing both the first digital data and second digital data; the apparatus comprises a first reproduction processing circuit for the first digital data, a second reproduction processing circuit for the second digital data and a control circuit supplied with reproduction control data distinguishing between the presence of the first and second discs, the control circuit outputting a signal so as to change over the control of reproducing operation of a pickup as well as to change over the first or second reproduction processing circuit.

BRIEF DESCRIPTION OF THE DRAWINGS

FIGS. 3A to 3C are schematic diagrams for use with an explanation of an arrangement of the Q-channel data of a subcoding signal.

BEST MODE FOR CARRYING OUT THE INVENTION

Figure 1:
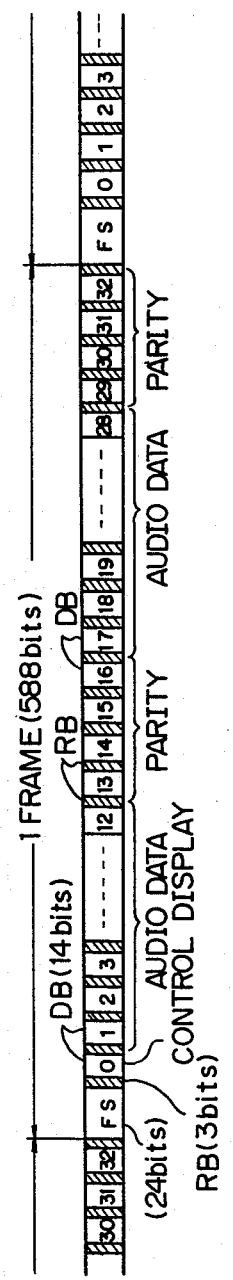
FIGS. 1 and 2 are schematic diagrams for use with an explanation of an arrangement of data stored in a disc.
Figure 2:
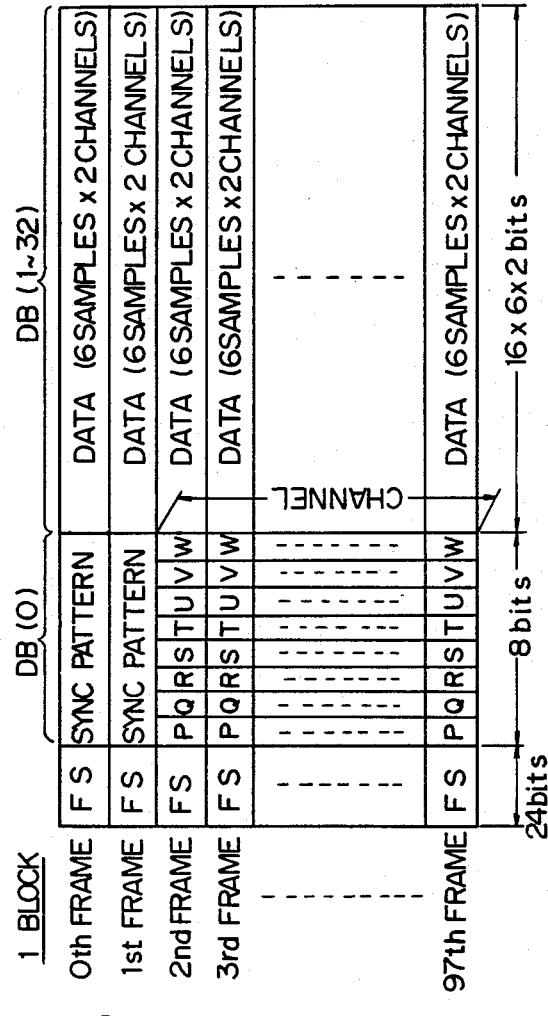

An embodiment of the invention is applied to the compact disc. Referring to FIGS. 1 and 2, data construction will be described, for the case in which audio data is stored in the compact disc.

FIG. 1 illustrates a data stream as stored in the compact disc. One frame consists of 588 bits of data to be recorded and includes a frame synchronizing pulse FS of a particular bit pattern which is followed by the first direct-current component constraint bits group RB consisting of 3 bits. Followingly, 0th to 32nd groups of data bits DB each consisting of 14 bits and groups of direct-current component constraint bits RB each consisting of 3 bits are provided alternately. The 0th data bits DB constitute a subcoding signal or user's bits which serves for controlling disc playback or indicating related informations. The 1st to 12th and 17th to 28th groups of data bits DB are allocated to audio data in a main channel, and the rest, 13th to 16th and 29th to 32nd groups of data bits DB are allocated to parity data for error corrtion of the main channel. Each group of data bits DB has 14 bits of data which has been converted during recording from 8 bits of data by an 8-14 modulation technique (EFM).

FIG. 2 shows one block consisting of parallel arranged successive 98 frames in which each group of data bits DB is converted back to 8 bits and the direct current component constraint bits RB are excluded. In the first two frames, the subcoding signals P to W constitute synchronizing patterns having paticular bit patterns. With respect to the Q-channel, the last 16 of the 98 frames constitute an error detection CRC code.

The P-channel is a flag indicating whether the frame is a pause or music, and a high level indicates a pause, a low level indicates music and a 2 Hz pulse indicates a lead-out section, so that the detecting and counting of the P-channel bits makes the selection of a designated musical piece possible. The Q-channel performs similar but more complicated control. Specifically, the Q-channel information can be supplied to a microprocessor built into the disc playback apparatus to allow such a random music selection as to begin to reproduction of another music selection immediately in the middle of reproduction of the currently selected music. The remaining channels R through W constitute regions for data indicating the songwriter, composer, text and explanation of the music recorded on the disc with display or voice.

Concerning the Q-channel, shown vertically in FIG. 2 the first 2 bits serve as part of the synchronizing signal pattern, the next 4 bits serve as control bits, the following 4 bits serve as address bits, and the subsequent 72 bits serve as data bits, and the final 16 bits serve as a CRC code. In the lead-in track, the last 96 bits of the Q-channel are defined as a data construction as shown in FIG. 3A. The control bits of 1st to 4th bits and address bits of 5th to 8th bits are followed by data bits of 72 bits. The data bits include a track number code TNR of 8 bits and each 4 bits of which vary and represent 0 to 9 of decimal so that the track number code TNR varies from 00 to 99. The track number TNR is 00 in the lead-in track. The 8 bits following the track number bits represent a pointer. The 4 bits following the pointer represent minutes (MIN) data, the 4 bits following the minutes data represent seconds (SEC) data and the 4 bits following the seconds data represent frames data (75 frames equivalent to one second). The 8 bits following the 49th bit are set as all 0 and subsequent groups of 4 bits represent minutes, seconds and frames data of the point.

In the lead-in track and in the musical program area, is stored specific minutes, seconds and frames data which vary with lapse of the time from zero minute, zero second and zero frame of the lead-in tack, or when a musical program comes to its end. The lead-in track stores TOC (Table Of Contents) data enumerating what is stored in the disc and consisting of the pointers minutes, seconds and frames of the pointers. That is, the values of minutes, seconds and frames of the starting point of each musical program bearing a particular track number constitute the data in the Q-channel of the lead-in track.

When the pointer value is A1 (hexadecimal-notation), the data of minutes indicated as P-MIN represents the track number of a first musical program in the disc, and both of the data of seconds and frames are zero. If the pointer value is A1, the data of minutes represent the track number of the last musical program in the disc, and both of the data of seconds and frames are zero. If the pointer value is A2, the data of minutes, seconds and frames represent the starting point of a lead-out track.

As described above, the lead-in track stores the data in the Q-channel but does not store stereo musical data in the main channel. Likewise, the lead-out track does not store stereo musical data. The standards for the prior art compact disc allow the presence of a maximum of 4 bits of data including the last bit of a 16-bit data word.

FIG. 3B illustrates an arrangment of data in the Q-channel in the program area. The first 4 bits constitute the control bits, the next 4 bits following the control bits constitute the address bits. The following 8 bits represent a track number TNR. As previously stated, the track number TNR of the lead-in track is 00. The track numbers TNR of the musical program area are 01 to 99. The track number TNR of the lead-out track is AA. The lead-out track starts from the end point of the last musical program stored in the disc.

8 bits following the track number TNR represent an index X. The index X serves to separate each musical program and increases from 01 to maximum 99 by one. In a pause section, the index always bears 00. Minutes, seconds and frames data following the index X represent the time-lapse of the musical program or pause. All of minutes (A MIN), seconds (A SEC) and frames (A FRAME) data following the all-zero 8 bits constitutes an absolute time data representing the time-lapse from the very beginning of the musical program area to the end of the lead-out track. The data stored in the compact disc are accessible by reference to the absolute time code.

The control bits in the Q-channel is defined as shown in FIG. 3C. In FIG. 3C, the symbol X represents a non-defined bit and may be either 0 or 1. Control bits (00X0) mean a non-preemphasized 2-channel audio data. Control bits (10XX) and (01X1) are not yet defined. Control bits (01X0) mean that the disc stores digital data such as still picture data. Control bits (XX0X) mean inhibition of reproduction of the digital data, and control bits (XX1X) mean allowance of reproduction of the digital data. In one embodiment of this invention, a disc storing both stereo musical data and other digital data has control bits (01X1).

Figure 4:
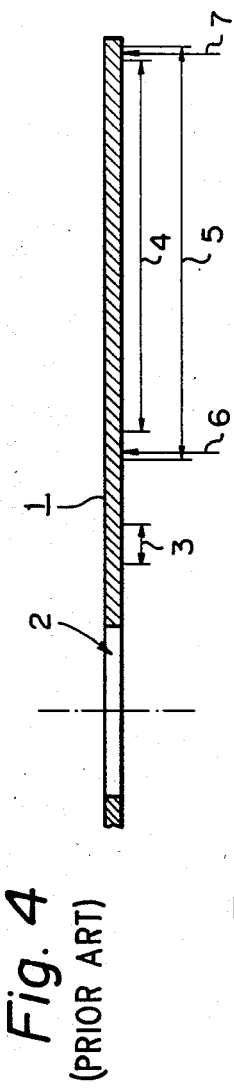
FIG. 4 is a cross-sectional diagram for use with an explanation of a prior art compact disc.

Referring to FIG. 4, a prior art compact disc storing such stereo musical data and subcoding signals as mentioned above will be described.

In FIG. 4, the reference numeral 1 designates a prior compact disc, and the reference numeral 2 designates a central hole thereof. The compact disc 1 is played with a reproducing laser beam from its underside, and playback proceeds from the inner periphery toward the outer periphery thereof. The diameter of the central hole 2 is 15 mm. The reference numeral 3 designates a clamping area (the radial range of 26 mm to 33 mm) where the compact disc 1 is supported, when the compact disc 1 is applied or ejected. The reference numeral 4 designates the program area (the radial range of 50 mm to 116 mm), the reference numeral 5 designates an information area (the radial range of 45 mm to 118 mm). The starting point 6 (at a maximum radius of 46 mm) of the lead-in track is located radially inward of the program area 4 but within the information area 5. The final lead-out point 7 is located radially outward of the program area 4 but within the information area 5.

A disc according to an embodiment of the invention has the same thickness and diameter as conventional compact discs 1 and stores both of stereo musical data and other digital data in the main channel data. The arrangement of data in the P-channel and Q-channel of the subcoding signals in the disc of this invention are the same as in the conventional compact disc.

Figure 5:
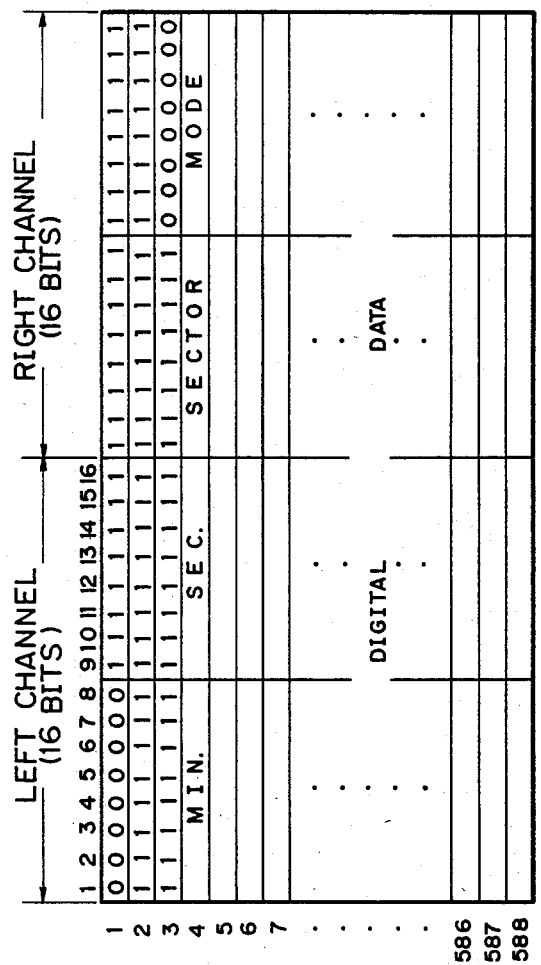
FIG. 5 is a schematic diagram for use with an explanation of the data construction of digital data.

FIG. 5 illustrates the recording format of the digital data. Each digital data comprises 2352 bytes ($=588 \times 4$ bytes) as an unit which is one block. In FIG. 5, the left channel and right channel as illustrated indicate correspondence to the sampling data of the left and right channels of stereo musical data. In case of stereo musical data, as above described, since 24 ($=6 \times 2 \times 2$) bits of data is recorded within the period defined by consecutive frame synchronizing signals, if other digital data is recorded in the same format (referring to FIG. 1) as for stereo musical data, the data of one block (2352 bytes) is recorded in frames of from 0th to 97th. Accordingly, the digital data can be recorded without disrupting the 98-frame cycle of the variation of the subcoding signals.

The first byte of the digital data of one block is all zeros and the next ten bytes are all ones, followed finally by another byte of zeros. These 12 bytes constitute a header indicating the beginning of one block of the digital data. The header is followed by one byte of minutes data, seconds data, sector data and mode data each of one byte. The minute, second and sector byte specify one block address, with the 75 sectors counting one second similar to 75 frames. The mode data indicates the kinds of digital data in the block. The remaining 2340 bytes comprises digital data such as still picture data other than the header, address (minutes, seconds, sector) and mode.

According to some embodiments of this invention, examples of discs storing both digital stereo musical data and other digital data will be now described, referring to FIGS. 6 to 9.

Figure 6:
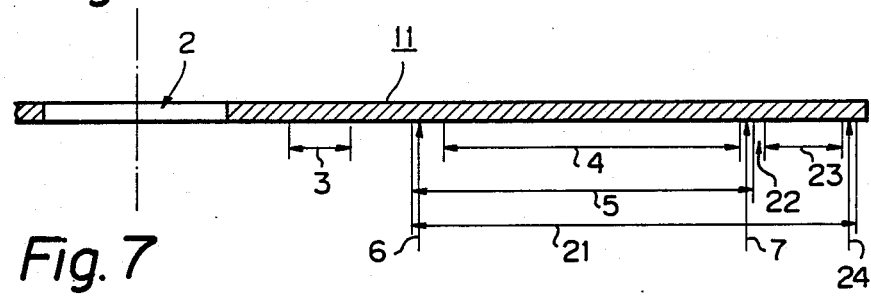
FIGS. 6 to 9 are cross-sectional diagrams showing discs according to some embodiments of this invention.

A disc 11 shown in FIG. 6 includes a generic information area 21 in which an information area 5 is located at a range from the inner point thereof to the predetermined outer point thereof. The digital stereo musical data is stored in a first program area 4 within the information area 5. A first lead-in track starting from a point 6 is located radially inward of the first program area 4. A lead-out track is located radially inward of the final lead-out point 7 but radially outside of the first program area 4. Subcoding signals stored in the first lead-in track and the first lead-out track and the first program area 4 of the disc of this invention are similar to those in the prior art compact disc. However, the control bits of the data in the Q-channel stored in the first lead-in track (track number TNR=00) are (01X1) which indicates that the disc stores both digital stereo musical data and other digital data.

Reading this control data by a disc playback apparatus, the playback starting point jumps to the start point of the first lead-out track, and the track number TNR=AA of the first lead-out track is neglected so as to control the playback of the disc and to playback the tracks in the outer periphery of the disc.

A second program area 23 is located outside of a second lead-in area 22 which is located outside of the information area 5 within the generic information area 21. A second lead-out track is located outside of the second program area 23 but inside of a second final lead-out limit 24. The second program area 23 stores digital data, for example, still picture data as shown in FIG. 5. The second lead-in area 22 and the second lead-out track store the subcoding signals of the Q-channel shown in FIG. 3B. The track number TNR of the second lead-in area 22 is AD and the track number TNR of the second lead-out track is AE.

The second lead-in area 22 stores necessary control information for playing back the disc 11. The disc playback apparatus reproduces the first and second program areas 4 and 23 in accordance with this control information until the track number AE of the second lead-out track is detected.

Figure 7:
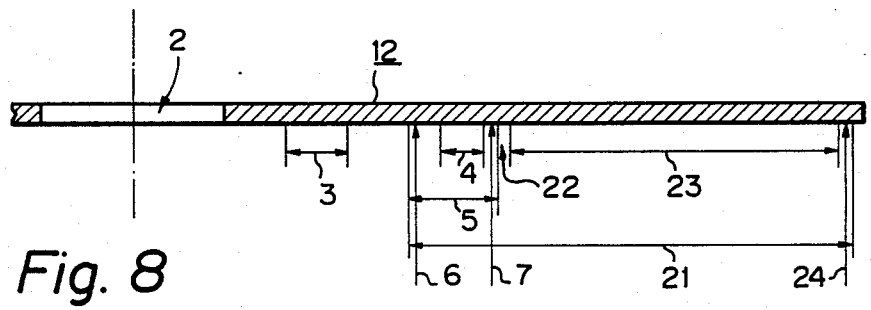

FIG. 7 illustrates a disc 12 according to a second example of this invention. A generic information area 21 of the disc 12 comprises the second program area 23 wider than the first program area 4 so as to mainly store the other digital data. The first program area 4 stores digital audio data representing a spoken notice—"This disc is not intended for music and cannot be played."—in Chinese, Japanese, English, German and/or French. This speech is convenient to prevent misunderstanding and damage to the player, when the disc storing the other digital data is played. However, the disc playback apparatus according to this invention, which is capable of playing back other digital data stored in the second program area 23 of the disc 12, can be signalled not to playback the notice by means of the control information stored in the second lead-in area 22.

Figure 8:
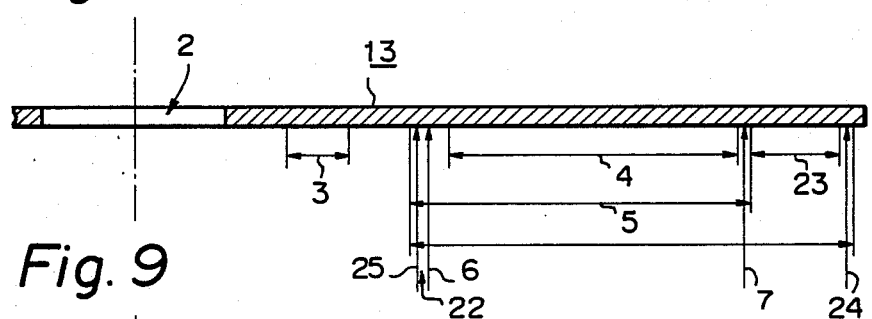

FIG. 8 shows a disc 13 serving mainly to playback digital stereo musical data similar to the disc 11 of FIG. 6. The starting point 25 of the second lead-in track is located radially inward of the starting point 6 of the first lead-in track. The starting points 6 and 25 delimit the second lead-in area 22.

This second lead-in area 22 stores as data in the Q-channel the control bits (01X1) indicating that the disc 13 stores both digital stereo data and the other digital data. The initial, inner tracks of the second program area 23 of the disc 13 store control information instructing how to playback the first and second program areas 4 and 23.

Figure 9:
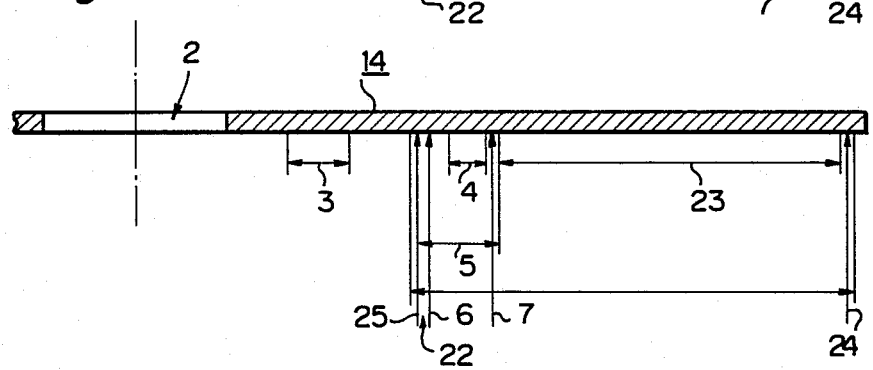

FIG. 9 illustrates a disc 14 serving mainly to playback the other digital data similar to the disc 12 of FIG. 7. The first program area 4 of the disc 14 stores a notice spoken in several languages announcing that the disc 14 is not for reproducing music. The first lead-in area is located radially inward of the first program area 4 and starts at the starting point 6 of the first lead-in track. The second lead-in area 22 is located radially inward of the first lead-in area and starts at the starting point 25 of the second lead-in track.

The discs 11, 12, 13 and 14 of this invention as above shown in FIGS. 6 to 9 can be used to reproduce not only both audio data and the other digital data by means of the disc playback apparatus of this invention but also audio data alone by means of a conventional disc playback apparatus.

Figure 10:
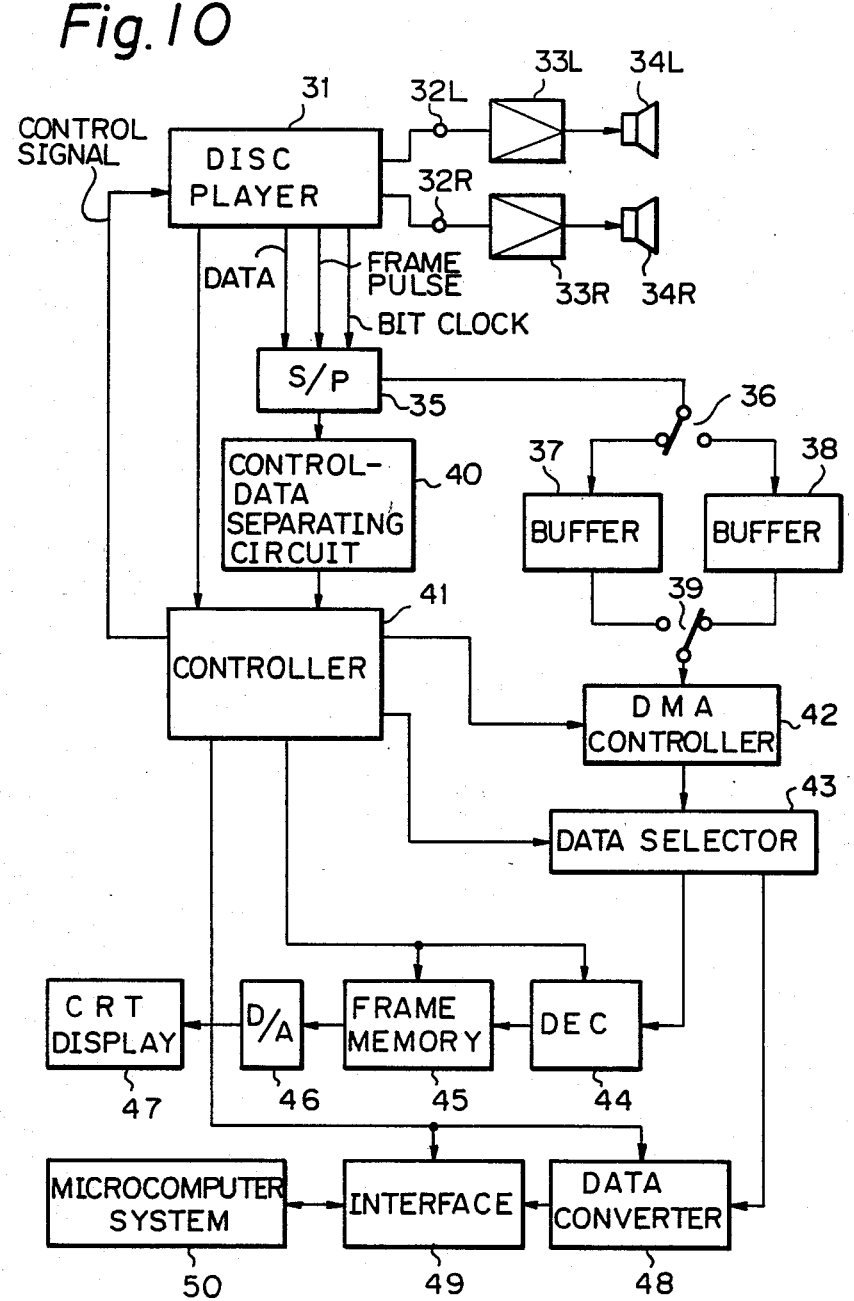
FIG. 10 is a block diagram showing an apparatus for playback of a disc according to an embodiment of this invention.

An embodiment of the disc playback apparatus of this invention will be described, referring to FIG. 10. In FIG. 10, the reference numeral 31 designates a disc player. Stereo music signal reproduced by the disc player 31 are outputted at output terminals 32L and 32R following demodulation of 8-14 modulated (EFM) data, error correction, interpolation and D/A conversion. The output terminals 32L, 32R of the disc player 31 are respectively supplied with left-channel and right-channel signals of the reproduced stereo signal. The audio signals in the respective left-channel and right-channel are supplied to left-side and right-side speakers 34L and 34R through amplifiers 33L and 33R, so that the user can enjoy the reproduced stereo music.

If the disc being reproduced by the disc player 31 stores digital data other than stereo musical data, the reproduced data from this disc is suppied to a serial-parallel converter 35, which receives frame pulses and a bit clock signal both synchronized with the reproduced data from the disc player 31 and outputs 8-bit parallel data comprising symbols. The parallel data are alternately written into buffer memories 37 and 38 selected by an input switch 36. A control-data separating circuit 40 is provided, connected to the serial-parallel conveter 35.

The reference numeral 41 designates a controller including a microcomputer. The controller 41 receives control data from the control-data separating circuit 40 and the subcoding signals from the disc player 31. The Q-channel of the subcoding signals includes a recognition code (control bits) indicating that the disc stores both stereo musical signals and the other digital data. The controller 41 generates a control signal to be supplied to the disc player 31 so as to control switching of the reproducing output signal path in accordance with the recognition code.

Contents of the buffer memories 37 and 38 are read out alternatingly by means of an output switch 39 and supplied to a DMA (direct memory access) controller 42 which is controlled by the controller 41.

The output from the DMA controller 42 is supplied to a data selector 43 which is controlled by the controller 41 and distributes the output data from the DMA controller 42 to different circuits in accordance with the mode of still-picture, digital data (game program etc.). In the still picture mode, output data from the data selector 43 is written into a frame memory 45 via a decoder 44 for colored-picture data consisting of Y, U and V components. The controller 41 controls the operation of the decoder 44 and the frame memory 45. The single-frame still picture data read out from the frame memory 45 is converted to analog color video signals by a D/A converter 46 and supplied to a CRT (cathod ray tube) display 47.

In the game program mode, the output data from the data selector 43 is supplied to a data converter 48 and convetered into serial data in a predetermined format, and are supplied to a microcomputer system 50 through an interface 49.

Figure 11A:
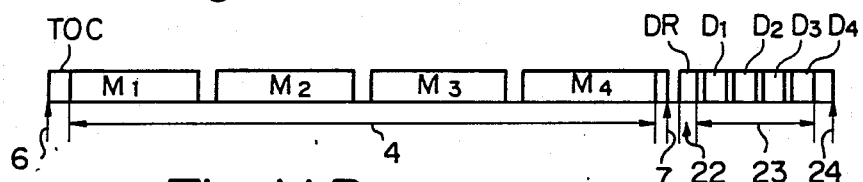
FIGS. 11(A&B) to 13 are schematic diagrams for use with an explanation of the playback operation of the apparatus for playback of disc shown in FIG. 10.

The operation of the above-mentioned disc playback apparatus will be described, for example, when the disc 11 of FIG. 6 is applied thereto. As shown in FIG. 11A, for the example, the first program area 4 of the disc 11 stores 4 musical selections M1, M2, M3 and M4 separated by pause sections respectively, and the second program area 23 of the disc 11 stores single-frame still picture data D1, D2, D3 and D4 respectively corresponding to the musical selections M1, M2, M3 and M4.

When the disc player 31 reproduces the first lead-in track from the start point 6, the TOC data in the Q-channel of the subcoding signals are reproduced and supplied to to a system controller (not shown) of the disc player 31 and the controller 41. Provided that the control bits in the Q-channel show (01X1), a pickup of the disc player 31 jumps over the program area a 4 shown in FIG. 11B without reproducing it and resumes reading operation from the starting point of the first lead-out track.

After the first lead-out track is reproduced, the disc player 31 reproduces the second lead-in area 22 and then supplies the controller 41 through the serial-parallel conveter 35 and a control-data separating circuit 40 with control data DR reproduced from the second lead-in area 22. Then, the first still picture data D1 is reproduced. The address data and mode data of the first still picture data D1 are supplied to the controller 41 through the serial-parallel converter 35 and the control-data separating circuit 40 and the reproduced digital data is supplied to the decoder 44 by the data selector 43. The still picture data D1 are written into the frame memory 45 through the buffer memory 37 or 38, the DMA controller 42, the data selector 43 and the decoder 44. In the case where the TOC data of the first lead-in area is reproduced first, a muting operation is performed so as to suppress audio output during reproduction of the second lead-in area 22 and the second program area 23.

Figure 11B:
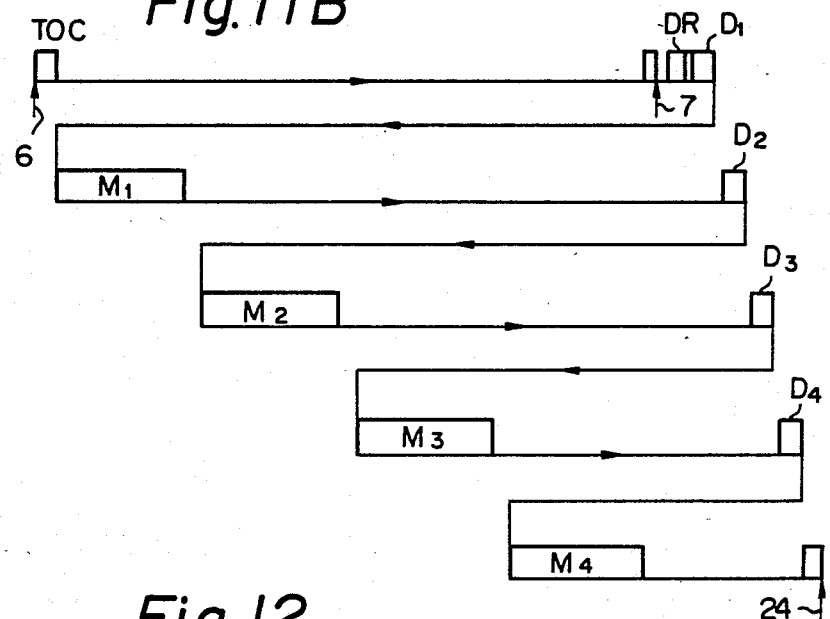
Figure 12:
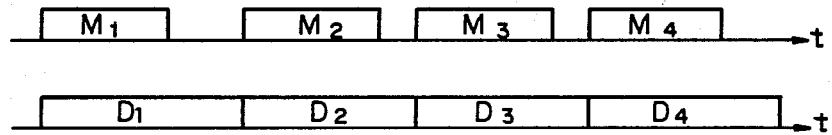
Figure 13:
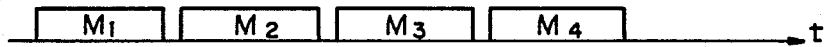

As shown in FIG. 11B, after completing the reproduction of the still picture data D1, the pick up returns to the starting point of the first musical selection M1 and starts to reproduce it. In this case, the still picture data D1, as shown in FIG. 12, will be repeatedly read out from the frame memory so as to display still picture on the CRT display 47. Thus, the still picture reproduced by the CRT display 47 can be watched while listening to the first musical selection M1. As shown in FIG. 11B, upon completion of reproducing the first piece M1, the pick up is quickly returned to the outer periphery of the disc 11 and then starts reproducing the still picture data D2 of the second program area 23. The TOC data of the first lead-in area or the control data of the second lead-in area 22 indicates where the still picture data D1 to D4 are stored in the second program area 23.

The reproduced still picture data D2 is treated like the still picture data D1 and, as shown schematically in FIG. 12, the music M2 is reproduced from the speakers 34L and 34R and at the same time, the still picture is reproduced by the CRT display 47. Likewise, the still picture data D3, the music selection M3, the still picture data D4 and the music selection M4 are sequentially reproduced. When the second lead-out area after the last music selection M4 is reproduced, completion of all of the program data is recognized and its reproducing operation is stopped.

The music data stored in the disc 11 can be reproduced by prior art disc playback apparatus capable of reproducing only stereo music. That is, reproduction of the first lead-in track is started from the start point 6 of the disc 11, and the TOC data is reproduced. Even if the control bits in the Q-channel in the first lead-in track is encoded as (01X1), the control bits is not decoded by the prior art disc playback apparatus and the meaning of the data is neglected. Therefore, the music selection M1, M2, M3 and M4 following the first lead-in track are sequentially reproduced. Completion of the first lead-out track is regarded as completion of all of the program data and its reproducing operation is stopped. Accordingly, the area outside of the first lead-out track is not reproduced so as to prevent noise from being generated due to reproduction of the control data DR and still picture data D1 to D4.

The data on the discs 12, 13 and 14 of FIGS. 7 to 9 can be reproduced similarly as above described.

Furthermore, the disc playback apparatus of FIG. 10 can be employed to playback the discs storing only stereo music as well as the discs storing only the other digital data. Namely, the control bits in the Q-channel reproduced from the first lead-in area works for switching of the reproduced signal processing circuit and for muting of reproducing system of audio data.

This invention is also applicable to magnetic discs and electrostatic capacitance discs.

According to this invention, it is realized to provide discs from which stereo music is reproduced without generating large noise due to reproduction of digital data, when it is played by to a prior art disc playback apparatus designed for playback of the conventional disc storing music data only. Discs according to this invention make simultaneous reproduction of stereo music data and still pictures possible. In addition, since digital data is recorded in the outward area of the disc, the waiting time prior to the start of reproducing stereo music data can be minimized.

According to this invention, it is possible to playback the discs storing both first digital data and second digital data as well as to prevent noise from being generated due to digital data other than audio data during reproduction. In this invention, since it is determined by recognition data whether the data stored in the disc is both of the first digital data and the second digital data or the first digital data only, prior art disc storing the first digital data only can be reproduced without trouble.

What is claimed is:

1. A disc having a first recording region for storing a first type of data signal, a second recording region succeeding said first recording region for storing a second type of data signal, a lead-in region preceding said first recording region for storing an identifying data signal for indicating the presence of said second recording region, and a lead-out region between said first recording region and said second recording region for storing an end data signal for indicating the end of said first recording region.

2. A disc as recited in claim 1, wherein said second type of data signal includes a control information data signal for controlling operation of a pickup of a disc playback apparatus during reproduction of a data signal from said disc.

3. A disc as recited in claim 1, wherein said first type of data signal includes a digital audio data signal.

4. A disc as recited in claim 1, wherein said second type of data signal includes a video data signal.

5. A disc as recited in claim 1, wherein said second type of data signal includes a computer program data signal.

6. A disc as recited in claim 1, wherein said identifying data signal includes a sub-channel data signal.

7. A disc playback apparatus capable of playing both of a first type of disc having a first recording region for storing a first type of data signal; and a second type of disc having said first recording region for storing said first type of data signal, a second recording region succeeding said first recording region for storing a second type of data signal, a lead-in region preceding the first recording region for storing an identifying data signal for indicating the presence of the second recording region, and a lead-out region between the first recording region and the second recording region for storing an end data signal for indicating the end of the first recording region, said apparatus comprising:
 a pickup means for obtaining a reproducing signal from the disc;
 a first reproduction processing circuit for reproducing said first type of data signal;
 a second reproduction processing circuit for reproducing said second type of data signal; and
 a control circuit supplied with said identifying data signal and for outputting a signal controlling operation of said pickup means and said first and second reproduction processing circuits.

8. A disc playback apparatus as recited in claim 7, wherein the identifying data signal are encoded in a sub-channel, and including means to inhibit the output of one of said first and second reproduction processing circuits, in response to said identifying signal.

9. A disc playback apparatus as recited in claim 7, wherein the second type of data signal includes a control signal for controlling operation of said pickup means and including means for supplying said control circuit with said control signal.

10. A disc playback apparatus as recited in claim 7, wherein the first type of data signal on both of the first and second types of discs include digital audio data, and said first reproduction processing circuit includes a reproducing circuit for reproducing an audio signal.

11. A disc playback apparatus as recited in claim 7, wherein the second type of data signal of the second type of disc include video data, and said second reproduction processing circuit includes a reproducing circuit for reproducing a video signal.

12. A disc playback apparatus as recited in claim 7, wherein the second type of data signal of the second type of disc include computer program data, and said second reproduction processing circuit includes a computer system.

* * * * *